Sept. 27, 1966     H. A. RALSTON     3,275,341
AGRICULTURAL IMPLEMENT TOOL BAR
Filed Jan. 21, 1964
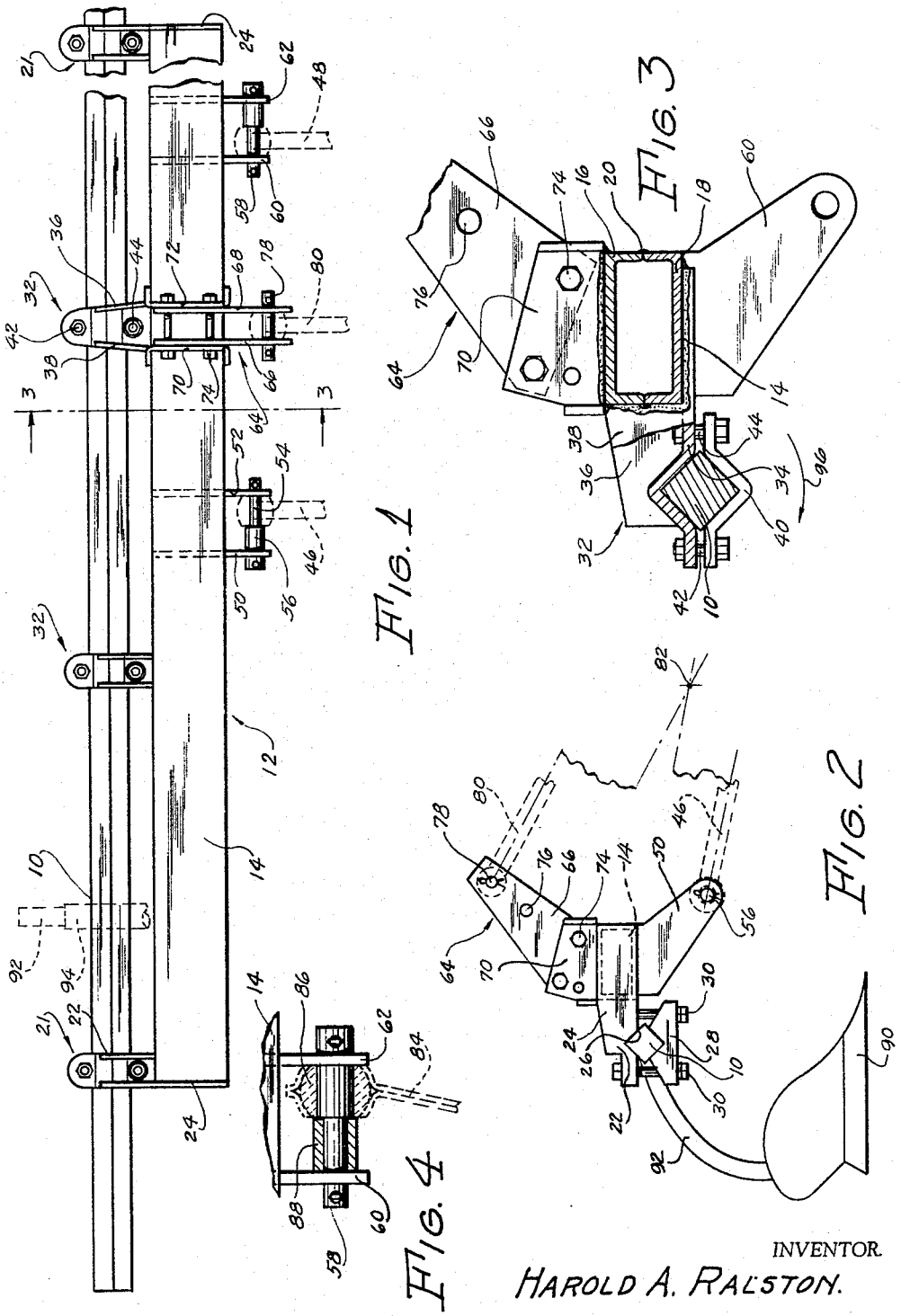
INVENTOR.
HAROLD A. RALSTON.
BY: EMERSON B. DONNELL, ATTY.
ROBERT D. GODARD, AGT.

United States Patent Office 3,275,341
Patented Sept. 27, 1966

3,275,341
AGRICULTURAL IMPLEMENT TOOL BAR
Harold A. Ralston, Rockford, Ill., assignor to J. I. Case Company, Racine, Wis., a corporation of Wisconsin
Filed Jan. 21, 1964, Ser. No. 339,167
8 Claims. (Cl. 280—460)

The present invention relates to agricultural implements, and more particularly to hitches or means for connecting implements to transporting and propelling vehicles or tractors, and an object is to generally improve devices of this class. It relates to such connecting devices commonly known as "tool bars."

A tool bar as known in the trade comprises a heavy bar disposed transversely behind a tractor and connected thereto at the mid portion of the bar. It is spaced above the ground, substantially parallel thereto, and when in use has clamped thereto a plurality of tools for engaging the soil, and which are commonly interchangeable with others of different types for performing different operations from time to time. It is desirable that such implements be interchangeable, and for this reason tool bars have become more or less standardized as square steel bars with the sides nominally at 45 degrees relatively to the ground, the bars being of uniform dimensions from end to end. In this way, tool bars are provided which will accept implements of various manufacturers. The implements may be distributed along such a bar in a great variety of patterns to suit the requirements of the field, or the preference of the operator.

Since the pull of the tractor has commonly been imposed on the mid portion of the bar, while the resistance of the soil has been imposed, not only at the mid portion, but also at the outer ends thereof, the bar has been subjected to severe bending stresses. Furthermore, since the pull of the tractor is imposed on the bar at a level above the ground, while the resistance of the implements (lister plows for example) is necessarily imposed at points below the ground, a strong turning or twisting effort has been imposed upon the bar, which has had to be resisted by the connection with the tractor. A stronger, more nearly rigid tool bar would be desirable, particularly in view of the trend toward more powerful tractors, and the principal object of the invention is to provide such a tool bar.

An incidental object of the invention is to provide a carrier unit which will attach to a tractor, and which may be attached to a tool bar, and which will support the same, propel it by reason of movement of the tractor, and which at the same time will reenforce the tool bar against bending under the backward reaction of the ground-working implements attached thereto, and against twisting by reason of the couple set up by the reaction of the ground-working implements on the upwardly spaced tool bar. A device for accomplishing the above objects is set forth in the following specification, and shown in the accompanying drawings, in which:

FIG. 1 is a fragmentary plan view of a tool bar incorporating the invention;

FIG. 2 is a right end elevation of the same;

FIG. 3 is an enlarged vertical sectional view on the line 3—3 of FIG. 1 with parts broken away; and FIG. 4 is an enlarged fragmentary detail of a connection indicated in FIG. 1, showing a modification.

Similar reference characters have been applied to the same parts throughout the specification and drawings.

A bar 10, FIG. 1, is typical of the type of tool bar contemplated, and is commonly a solid steel bar of square or angular cross section, and of generous dimensions. However, tractors of greater power are being built all the time, and even bar 10 can be subject to bending and twisting under such extreme stress as developed by a modern tractor. While the logical remedy would seem to be to enlarge bar 10, such a solution would immediately outdate a large number of implements already in existence, and which would be otherwise usable for some time. Furthermore, a sufficiently rugged connection of such a bar to a tractor would encumber a substantial part of the length of the bar near the mid portion so as to limit the availability of the bar for attachment of implements.

A carrier unit generally designated as 12 can be used and which will free bar 10 to a large extent for the application of implements, and which may also lend its strength to reenforce bar 10.

Carrier unit 12 comprises a girder 14, preferably tubular or of box section, in the present instance formed from an upper channel 16, FIG. 3, and a lower channel 18, the channels being placed with the edges or margins of their flanges together and welded at 20. In this way, a girder is provided which is relatively inexpensive, and which is very strong in bending and in torsion. Girder 14 is disposed along a large part of the length of bar 10 preferably parallel thereto, and has a clamp 21 arranged to engage bar 10, and which is welded or otherwise ruggedly secured to girder 14. Clamp 21 comprises a main body portion 22 including an end plate 24 which closes the open end of girder 14, and is incorporated as a part of clamp 21. Body portion 22 provides a downwardly open notch 26 which is contoured to fit on top of bar 10, and a cap 28 fits the underside of bar 10 beneath body portion 22, and is clamped against the bar by bolts 30. In this way, bar 10 is ruggedly fixed in relation to girder 14, and cannot change position, at least in the region of clamp 21, without carrying with it girder 14.

A substantially identical clamp structure is located at the opposite end of girder 14 so that both ends of the girder are closed, and the tool bar is ruggedly supported at the extreme ends of girder 14.

Between clamps 21, another clamp as 32 is utilized to further support and brace bar 10 so that no very substantial length of bar 10 is left unsupported, while at the same time, by far the greater part of the length of bar 10 is left unemcumbered for the attachment of implements in any desired pattern.

Clamp 32, as better seen in FIG. 3, comprises a lower web 34 and side flanges 36 and 38 integral or permanently united with web 34 and extending upwardly. Side flanges 36 and 38 are welded or otherwise suitably permanently united with the rearwardly directed face of girder 14, and web 34 extends backwardly, upwardly, and again downwardly over the upper surface of bar 10, flanges 36 and 38 being notched to correspond with the contour of web 34.

Beneath bar 10, a clamping yoke 40 is urged upwardly by suitable bolts 42 and 44 so as to clamp bar 10 in a very rugged manner in spaced relation to girder 14.

Girder 14 is carried on a tractor (not shown) but having rearwardly extending draft links 46 and 48. Girder 14 has downwardly and forwardly extending plates 50 and 52 in which is engaged a pin 54 having an enlarged portion 56, with which draft bar 46 is engaged for propelling carrier 12. Draft bar 48 is engaged with a substantially identical pin 58 carried by plates 60 and 62 in similar manner. Draft bar 46 is therefore retained between plate 52 and the larger portion of pin 54 while draft bar 48 is retained between plate 60 and the enlarged portion of pin 58.

Girder 14 also has an upstanding mast portion 64 comprising plates 66 and 68 spaced apart lengthwise of girder 14 and fastened to attaching plates 70 and 72 respectively by bolts 74. Plates 66 and 68 are provided with extra holes as 76 so that the plates may be assembled with girder 14 in different relations to suit the characteristics of different tractors. Plates 66 and 68 carry an attaching pin 78 engaged with upper link 80; link 80 and draft bars 46 and 48 constituting a well-known type of three-point hitch for transporting and pulling a great variety of implements attachable thereto.

Link 80, commonly lies in forwardly and downwardly converging relation with the plane of draft bars 46 and 48, the intersection of link 80 and said plane defining a virtual hitch point 82 about which implements attached to the hitch may be considered to swing up and down—particularly for small increments of movement, and tool bar 10 and carrier 12 partake of this movement.

Another type of three-point hitch involves draft bars analogous to draft bars 46 and 48, one of which, 84, is shown in FIG. 4. Draft bar 84 includes a ball connection 86 journaled on the large portion of pin 58, draft bar 84 being swingable in any direction about ball 86. In this type of connection, a spacing sleeve 88 is placed on the reduced portion of pin 58 to prevent ball 86 from being displaced from the enlarged portion of pin 58. Identical pins are therefore usable with either type of hitch by the addition of spacers 88.

Turning to FIG. 2, bar 10 is shown as carrying a plow or lister bottom 90 through a beam 92 which is clamped in any suitable manner to bar 10, as for example, by clamp 94 shown in FIG. 1. Assuming bar 10 to be propelled to the right as seen in FIG. 2, and plow bottom 90 to be working in the soil, it will be apparent that there will be a strong forward pull on bar 10 and an equally strong backward reaction or pull on plow bottom 90. By reason of the vertical displacement between these two opposed forces, there will be a strong tendency to rotate bar 10 in a clockwise direction, beam 92 and plow bottom 90 being otherwise unsupported and unguided, the two opposed spaced forces constituting a couple. This rotating tendency is indicated in FIG. 3 by the arrow 96, and is transferred to girder 14 by clamps 21 and 32. Such tendency will press the upper margins of flanges 36 and 38 against girder 14, while at the same time tending to pull the lower margins of said flanges away from girder 14. This latter tendency is added to by the backward pull or reaction of plow bottom 90, so that a very strong force is developed tending to tear flanges 36 and 38 away from girder 14, or the part constituted by channel 18. To resist this tendency, above-mentioned web 34 is preferably extended forwardly, or to the right beneath channel 18, substantially beyond the margins of flanges 36 and 38 and permanently united; as for example, by welding to the lower surface of girder 14. In this way, a very strong connection is effected by the clamp 32 and girder 14, and which is extremely rigid in the region where the strains of operation tend to concentrate.

The operation of the device is thought to be clear from the foregoing description, it being apparent that carrier 12 is readily attached to any one of a variety of three-point hitches and will support and draw or propel a standard-sized tool bar, while reinforcing the same against distortion. Furthermore, the device accomplishes this object without encumbering an excessive portion of the length of the tool bar.

Modifications may occur to those skilled in the art; for example, for tractors of less power, or where it is not desired to work on such a wide area, clamp 32 may be omitted and carrier 12 may be shorter, the end clamps 21 closing the ends of the shorter girder as before.

The above being a complete description of an illustrative embodiment of the invention, what is claimed as new and desired to be secured by Letters Patent of the United States is:

1. A carrier for a tool bar of the type comprising a long slender rod of angular cross section adapted to selectively support and propel a variety of ground working implements clamped in spaced relation therealong, said carrier including a girder having a bending and torsional resistance largely in excess of that of said rod, disposed substantially parallel thereto, clamp means spaced along the length of said girder, rigidly attached thereto, and rigidly attached to said rod to interconnect the rod and girder whereby implements may be conveniently clamped to said rod selectively at many points without interference from said means while said rod is strengthened against bending and twisting by said means spaced along said girder, and means on said girder including forwardly and downwardly extending plates for connection to a vehicle for supporting and propelling said carrier.

2. A carrier for a tool bar of the type comprising a long slender rod of angular cross section adapted to selectively support and propel a variety of ground working implements clamped in spaced relation therealong, said carrier including a hollow girder having a bending and torsional resistance largely in excess of that of said rod, disposed substantially parallel thereto, clamp means spaced along the length of said hollow girder, rigidly attached thereto, and rigidly attached to said rod to interconnect the rod and girder whereby implements may be conveniently clamped to said rod selectively at many points without interference from said means while said rod is strengthened against bending and twisting by said means spaced along said hollow girder, and means on said hollow girder including forwardly and downwardly extending plates for connection to a vehicle for supporting and propelling said carrier.

3. A carrier for a tool bar of the type comprising a long slender rod of angular cross section adapted to selectively support and propel a variety of ground working implements clamped in spaced relation therealong, said carrier including a box-section girder having a bending and torsional resistance largely in excess of that of said rod, disposed substantially parallel thereto, clamp means spaced along the length of said box-section girder, rigidly attached thereto, and rigidly attached to said rod to interconnect the rod and girder whereby implements may be conveniently clamped to said rod selectively at many points without interference from said means while said rod is strengthened against bending and twisting by said means spaced along said box-section girder, and means on said box-section girder including forwardly and downwardly extending plates and a universal member for connection to a vehicle for supporting and propelling said carrier.

4. A carrier for a tool bar of the type comprising a long slender rod of angular cross section adapted to selectively support and propel a variety of ground working implements clamped in spaced relation therealong said carrier including a box-section girder comprising a pair of opposed channel section members having the margins of their longitudinal flanges each permanently united in abutting relation with those of the opposite channel member said girder having a bending and torsional resistance largely in excess of that of said rod, and being disposed substantially parallel thereto, clamp means spaced along the length of said girder, rigidly attached thereto, and rigidly attached to said rod to interconnect the rod and girder whereby implements may be conveniently clamped to said rod selectively at many points without interference from said means while said rod is strengthened against bending and twisting by said means spaced along said girder, and means on said girder including forwardly and downwardly extending plates and a universal member for connection to a vehicle for supporting and propelling said carrier.

5. A carrier for a tool bar of the type comprising a long slender rod of angular cross section adapted to selectively support and propel a variety of ground working implements clamped in spaced relation therealong, said carrier including a girder having a bending and torsional resistance largely in excess of that of said rod, disposed substantially parallel thereto, means rigidly attached to said girder and rigidly attached to said rod to interconnect the rod and girder, and means on said girder comprising a forwardly and downwardly extending plate, a hitch pin extending from said plate and having a portion of small diameter for the reception of a draft bar, and a coaxial portion of a larger diameter for reception of a different draft bar, and a spacer on said portion of small diameter positioned to engage a draft bar on said portion of larger diameter and prevent the shifting of the second-mentioned draft bar onto said portion of small diameter.

6. A carrier for a tool bar of the type comprising a long slender rod of angular cross section adapted to selectively support and propel a variety of ground working implements clamped in spaced relation therealong said carrier including a girder having a bending and torsional resistance largely in excess of that of said rod, disposed substantially parallel thereto, means rigidly attached to said girder and rigidly attached to said rod to interconnect the rod and girder, and means on said girder comprising a pair of spaced forwardly and downwardly extending plates, a hitch pin exteinding between said plates and having a portion of small diameter for the reception of a draft bar, and a coaxial portion of a larger diameter for reception of a different draft bar, and a spacer on said portion of small diameter positioned to engage a draft bar on said portion of larger diameter and prevent the shifting of the second-mentioned draft bar onto said portion of small diameter.

7. A carrier for a tool bar of the type comprising a long slender rod of angular cross section adapted to selectively support and propel a variety of ground working implements clamped in spaced relation therealong, said carrier including a girder having a bending and torsional resistance largely in excess of that of said rod, disposed substantially parallel thereto, means spaced along the length of said girder, rigidly attached thereto, and rigidly attached to said rod to interconnect the rod and girder whereby implements may be conveniently clamped to said rod, selectively at many points without interference from said means while said rod is strengthened against bending and twisting by said means spaced along said girder, and means on said girder comprising a forwardly and downwardly extending plate, a hitch pin extending from said plate and having a portion of small diameter for the reception of a draft bar, and a coaxial portion of a larger diameter for reception of a different draft bar, and a spacer on said portion of small diameter positioned to engage a draft bar on said portion of larger diameter and prevent the shifting of the second-mentioned draft bar onto said portion of small diameter.

8. A carrier for a tool bar of the type comprising a long slender rod of angular cross section adapted to selectively support and propel a variety of ground working implements clamped in spaced relation therealong, said carrier including a girder having a bending and torsional resistance largely in excess of that of said rod, disposed substantially parallel thereto, means spaced along the length of said girder, rigidly attached thereto, and rigidly attached to said rod to interconnect the rod and girder whereby implements may be conveniently clamped to said rod, selectively at many points without interference from said means while said rod is strengthened against bending and twisting by said means spaced along said girder, and means on said girder comprising a pair of spaced forwardly and downwardly extending plates, a hitch pin extending between said plates and having a portion of small diameter for the reception of a draft bar, and a coaxial portion of a larger diameter for reception of a different draft bar, and a spacer on said portion of small diameter positioned to engage a draft bar on said portion of larger diameter and prevent the shifting of the second-mentioned draft bar onto said portion of smaller diameter.

References Cited by the Examiner

UNITED STATES PATENTS

| | | | |
|---|---|---|---|
| 2,698,564 | 1/1965 | Sawyer | 280—461 |
| 2,751,835 | 6/1956 | Silver | 280—460 X |
| 2,998,965 | 9/1961 | Larson | 172—677 |
| 3,077,231 | 2/1963 | Hamilton | 172—421 |

LEO FRIAGLIA, *Primary Examiner.*